(12) United States Patent
Kim

(10) Patent No.: US 9,372,355 B2
(45) Date of Patent: Jun. 21, 2016

(54) METHOD OF MANUFACTURING CURVED DISPLAY APPARATUS

(71) Applicant: Samsung Display Co., Ltd., Yongin, Gyeonggi-do (KR)

(72) Inventor: Mincheol Kim, Yongin (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/711,166

(22) Filed: May 13, 2015

(65) Prior Publication Data

US 2016/0124252 A1    May 5, 2016

(30) Foreign Application Priority Data

Oct. 30, 2014   (KR) .................. 10-2014-0149328

(51) Int. Cl.

| | | |
|---|---|---|
| *F23Q 23/08* | (2006.01) | |
| *F23Q 23/10* | (2006.01) | |
| *H01T 21/06* | (2006.01) | |
| *G02F 1/13* | (2006.01) | |
| *H05B 33/10* | (2006.01) | |
| *G09G 3/00* | (2006.01) | |

(52) U.S. Cl.
CPC .............. *G02F 1/1309* (2013.01); *G09G 3/006* (2013.01); *H05B 33/10* (2013.01)

(58) Field of Classification Search
CPC ............... H01J 9/42; H01J 9/44; H01J 9/244; H01J 9/18; H01J 29/073; H01J 2209/185; G02F 1/1309; H05B 33/10
USPC .................................................. 445/3, 63, 64
See application file for complete search history.

(56) References Cited

U.S. PATENT DOCUMENTS

| | | | | |
|---|---|---|---|---|
| 2009/0219521 | A1* | 9/2009 | Shin ..................... | G02F 1/1309 356/239.2 |
| 2012/0050487 | A1* | 3/2012 | Masumura ......... | H04N 13/0406 348/46 |
| 2012/0127324 | A1* | 5/2012 | Dickins .................. | G09G 3/006 348/191 |
| 2013/0050504 | A1* | 2/2013 | Safaee-Rad .............. | G09G 5/02 348/181 |
| 2014/0307257 | A1 | 10/2014 | Takagi | |
| 2014/0355677 | A1* | 12/2014 | Kondo ................. | H04N 19/103 375/240.12 |

FOREIGN PATENT DOCUMENTS

| | | |
|---|---|---|
| JP | 8-292409 A | 11/1996 |
| JP | 2010-091509 A | 4/2010 |
| JP | 2013-152217 A | 8/2013 |

* cited by examiner

*Primary Examiner* — Anne Hines
*Assistant Examiner* — Jose M Diaz
(74) *Attorney, Agent, or Firm* — Knobbe, Martens, Olson & Bear, LLP

(57) ABSTRACT

A method of manufacturing a curved display apparatus is disclosed. In one aspect, the method includes forming a curved display panel including a plurality of pixels and a controller configured to respectively apply a plurality of electrical signals to the pixels. The method also includes arranging the curved display panel, a lens, and a camera such that the lens is interposed between the curved display panel and the camera and respectively applying, by the controller, the electrical signals to the pixels. The method further includes obtaining optical information with the camera while the electrical signals are applied to the pixels and setting the controller based at least in part on the obtained optical information.

5 Claims, 2 Drawing Sheets

METHOD OF MANUFACTURING CURVED DISPLAY APPARATUS

CROSS-REFERENCE TO RELATED APPLICATIONS

This application claims the benefit of Korean Patent Application No. 10-2014-0149328, filed on Oct. 30, 2014, in the Korean Intellectual Property Office, the disclosure of which is incorporated herein in its entirety by reference.

BACKGROUND

1. Field the described technology generally relates to a method of manufacturing a curved display apparatus.

2. Description of the Related Technology

One type of display apparatus is a flat panel display having a flat image reproduction surface. Recently, in addition to flat panel displays, curved displays having an image reproduction surface which is maintained in a curved state have been undergoing development. Curved displays are widely recognized as having advantages over traditional displays including, for example, providing a heightened sense of immersion.

However, in the standard method of manufacturing curved displays, a substrate is fixedly curved after a display device is formed on a flat substrate. Accordingly, the method includes bending the substrate which can lead to the generation of defects, thereby lowering the manufacturing yield.

SUMMARY OF CERTAIN INVENTIVE ASPECTS

One inventive aspect is a method of manufacturing a curved display apparatus that can reproduce high quality images.

Additional aspects will be set forth in part in the description which follows and, in part, will be apparent from the description, or may be learned by practice of the presented embodiments.

Another aspect is a method of manufacturing a curved display apparatus including forming a curved display panel, arranging the curved display panel, a lens unit, and an inspection camera such that the lens unit is interposed between the curved display panel and the inspection camera, obtaining optical information by using the inspection camera in a state in which an electric signal is applied to each of pixels of the curved display panel, and setting a control unit that controls the electric signal applied to each of the pixels of the curved display panel, by using the obtained optical information.

The lens unit may convert light emitted from the pixels of the curved display panel to be incident on the inspection camera while being parallel to each other. Considering a plane that is between the inspection camera and the curved display panel and perpendicular to a straight line that is perpendicular to a center of a display surface of the curved display panel, a distance between the panel and the center of the display surface may be greater than a distance between the plane and other positions on the display surface except the center on the display surface, and the lens unit may include a concave lens.

A radius of curvature of a display surface of the curved display panel may not be constant.

The method may further include correcting the optical information obtained by using the inspection camera so as to correct for influence introduced due to the lens unit, wherein the setting of the control unit is setting the control unit based on corrected optical information.

Another aspect is a method of manufacturing a curved display apparatus comprising forming a curved display panel including a plurality of pixels and a controller configured to respectively apply a plurality of electrical signals to the pixels; arranging the curved display panel, a lens, and a camera such that the lens is interposed between the curved display panel and the camera; via the controller, respectively applying the electrical signals to the pixels; obtaining optical information with the camera while the electrical signals are applied to the pixels; and setting parameters of the controller which control correction of the electrical signals based at least in part on the obtained optical information.

In example embodiments, the method further comprises the lens converting light emitted from the pixels of the curved display panel so as to be substantially parallel when incident on the camera.

In example embodiments, the distance between the center of a display surface of the curved display panel and an imaginary plane is greater than the distance between the imaginary plane and other positions on the display surface except the center on the display surface, wherein the imaginary plane is substantially perpendicular to a straight line extending from and perpendicular to the center of the display surface, and wherein the lens comprises a concave lens.

In example embodiments, the radius of curvature of a display surface of the curved display panel is not constant.

In example embodiments, the method further comprises correcting the optical information obtained with the camera so as to correct for influence introduced due to the lens unit, wherein the setting of the controller is based at least in part on the corrected optical information.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION OF CERTAIN INVENTIVE EMBODIMENTS

Figure 1:
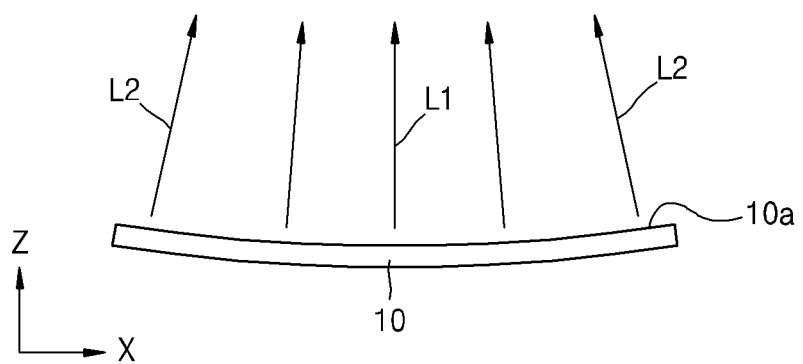
FIG. 1 is a conceptual side view schematically illustrating the direction in which light is travelling when emitted from a curved display apparatus.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

In the following examples, the x-axis, the y-axis and the z-axis are not limited to the three axes of the rectangular coordinate system, and may be interpreted in a broader sense. For example, the x-axis, the y-axis, and the z-axis may be perpendicular to one another, or may represent different directions that are not perpendicular to one another.

FIG. 1 is a conceptual side view schematically illustrating the direction in which light is travelling when emitted from a curved display apparatus. Referring FIG. 1, a curved display panel 10 is illustrated. Exemplary technologies used by the curved display panel 10 include a liquid crystal display panel and an organic light-emitting diode (OLED) display panel.

When the curved display panel 10 is embodied as a liquid crystal display panel, a backlight unit or backlight is included and light emitted from the backlight unit passes through pixels of the liquid crystal display panel and for transmission to a viewer. When the curved display panel 10 is embodied as an OLED display panel, light emitted from the panel is transmitted directly to a viewer. As such, light passing through a display surface 10a or light emitted from the display surface 10a of the curved display panel 10 arrives at a viewer. In any case, in the following description, for convenience of explanation, the light passing through the display surface 10a or the light emitted from the display surface 10a are altogether referred to as light emitted from the curved display panel 10 or light emitted from the display surface 10a of the curved display panel 10. For reference, the display surface 10a may generally refer to a surface where a liquid crystal display panel or an OLED display panel is located.

Since the curved display panel 10 is not flat, but is curved, beams of light L1 and L2 emitted from the display surface 10a of the curved display panel 10 are not parallel to each other, as illustrated in FIG. 1. FIG. 1 illustrates that light L1 travelling in a +z direction from the center of the display surface 10a of the curved display panel 10 and light L2 travelling in a direction that is not parallel to the +z axis at an edge of the display surface 10a. For reference, it can be understood that light at each position on the display surface 10a of the curved display panel 10 travels in a direction substantially perpendicular to a tangential plane contacting the display surface 10a at the same position. Although there are light components travelling in other directions, when the light at the position is observed at various viewing angles, the direction in which the light at the position is observed at its greatest brightness is the direction substantially perpendicular to the tangential plane contacting the display surface 10a.

If the curved display panel 10 is appropriately manufactured as desired, when the same electric signal is applied to each of the pixels of the curved display panel 10, light emitted from all pixels have a substantially uniform brightness. Also, when an electric signal is applied to each of the pixels of the curved display panel 10 so that the curved display panel 10 displays a white image, all pixels emit white light. However, when there are problems in the manufacturing process or for other reasons, even when the same electric signal is applied to each of the pixels of the curved display panel 10, the brightness of light emitted from some pixels may be different from that of the light emitted from other pixels. These manufacturing problems or other reasons, some pixels may emit light of a particular color, e.g., not a white light even when an electric signal is applied to each of the pixels of the curved display panel 10 such that the curved display panel 10 displays a white image. When all curved display panels having such defects are regarded as defective products, the manufacturing yield of a curved display apparatus is lowered and thus overall manufacturing costs are increased.

Accordingly, the method of manufacturing a curved display apparatus according to the present exemplary embodiment includes a process of fixing the curved display panel 10 having the above-described brightness defect or white balance defect to operate normally.

Figure 2:
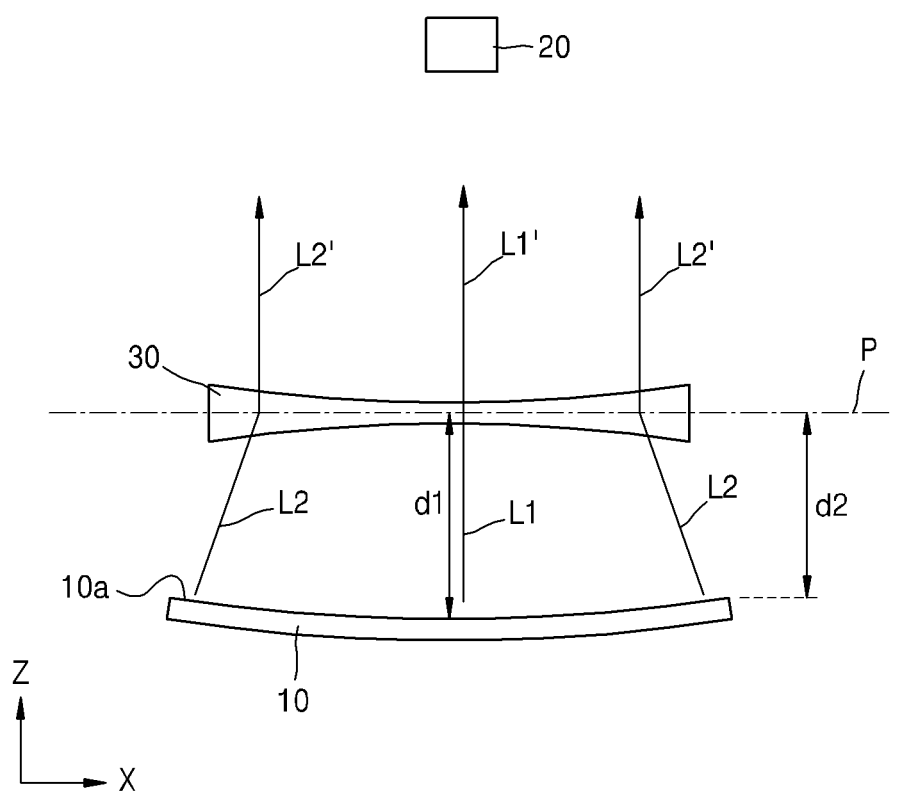
FIG. 2 is a conceptual side view schematically illustrating a method of manufacturing a curved display apparatus according to an exemplary embodiment.

To this end, as illustrated in FIG. 2, the curved display panel 10, a lens unit or lens 30, and an inspection camera 20 are arranged such that the lens unit 30 is interposed between the curved display panel 10 and the inspection camera 20. In FIG. 2, for convenience of explanation, the curved display panel 10 and the inspection camera 20 are illustrated as close to each other. However, in practice, the distance between the curved display panel 10 and the inspection camera 20 may be very long.

Next, optical information is obtained by the inspection camera 20 when an electric signal is applied to each pixel of the curved display panel 10. For example, the inspection camera 20 can obtain image data about the display surface 10a of the curved display panel 10. A control unit or controller (not shown) for controlling the electric signal to be applied to each pixel of the curved display panel 10 can be set such that the optical information can be obtained as above.

For example, according to a result of analyzing the optical information obtained when an electric signal is applied to each pixel of the curved display panel 10 so that light of the same brightness is emitted from all of the pixels of the display, it may be observed that the brightness of light emitted from a particular pixel is lower than that of light emitted from other pixels. Thus, the control unit can be set such that, when an electric signal is applied to the particular pixel, an electric signal that can compensate for the low brightness is applied.

In detail, when the curved display panel 10 includes an OLED display panel that is a current driving display device, the brightness of light emitted from a particular pixel may be determined from optical information to be lower than that of light emitted from another pixel. Thus, during driving of the particular pixel, the control unit can be set to apply, to the particular pixel, a larger amount of current than the amount of current normally required to emit light of a brightness level according to an image to be displayed. As a result, the particular pixel can be prevented from emitting light with a brightness level lower than desired.

In another example, according to a result of analyzing the optical information obtained when an electric signal is applied to each pixel of the curved display panel 10 so that color coordinates of light are emitted from all of the pixels of the display, it may be observed that the color coordinates of light emitted from a particular pixel is different from that of light emitted from other pixels. Thus, the control unit can be set such that, when an electric signal is applied to the particular pixel having a different color coordinate, the electric signal is set such that it can compensate for such a color coordinate difference.

In detail, when the color coordinates of light emitted from a particular pixel is determined from optical information to be different from that of light emitted from another pixel, the control unit can be set to apply an electric signal that corrects the emission of light to an accurate color coordinate by implementing a light amount emitted from a red sub-pixel, a light amount emitted from a green sub-pixel, and a light amount emitted from a blue sub-pixel which are respectively different from a light amount emitted from a red sub-pixel, a light amount emitted from a green sub-pixel, and a light amount emitted from a blue sub-pixel that are expected according to an image to be displayed. For example, it may be determined through the optical information that a color coordinate at the particular pixel is deviated toward red. In this situation, the control unit can be set to apply, to the red sub-pixel of the particular pixel, an electric signal having lower intensity or value than an electric signal corresponding to a light amount of the red sub-pixel expected according to an image to be displayed. In some embodiments, parameters of the control unit which control the correction of the signals applied to the respective sub-pixels (e.g., the color coordinates) are set based on the optical information. As a result, an inaccurate color coordinate problem at the particular pixel may not be generated thereafter.

Accordingly, by employing the above processes, even when a brightness defect or color coordinate imbalance occurs in a particular pixel in a process of forming the curved display panel 10, the control unit is set to apply an electric signal that compensates for the defect or imbalance, to the particular pixel. Thus, a curved display apparatus having no defects can be manufactured. In addition, manufacturing yield of curved display apparatus can be drastically improved.

Alternatively, as illustrated in FIG. 1, since the curved display panel 10 is not flat, but is curved, the light L1 and L2 emitted from the display surface 10a of the curved display panel 10 are not parallel to each other. Accordingly, in a state illustrated in FIG. 1, when optical information about the curved display panel 10 is obtained by using the inspection camera 20 without the lens unit 30, accurate optical information may not be obtained.

In detail, for a pixel located at the center of the curved display panel 10, the inspection camera 20 obtains optical information of the pixel in a direction perpendicular to the tangential plane contacting the display surface 10a of the curved display panel 10 at the position of the pixel. However, for a pixel located at a position other than the center of the curved display panel 10, the inspection camera 20 obtains optical information of the pixel in a direction oblique, i.e., not perpendicular, to the tangential plane contacting the display surface 10a of the curved display panel 10 at the position of the pixel. Accordingly, distorted optical information may be obtained instead of accurate optical information.

However, according to the method of manufacturing a curved display apparatus according to the present exemplary embodiment, accurate optical information instead of distorted optical information can be obtained owing to the lens unit 30. In detail, the lens unit 30 changes optical paths of the light L1 and L2 emitted from the pixels of the curved display panel 10 and thus light L1' and L2' that are parallel to each other can be incident on the inspection camera 20. Accordingly, the inspection camera 20 can obtain accurate optical information about the pixels of the curved display panel 10 and thus the control unit can be accurately set. As a result, a curved display apparatus that can display a high quality image can be manufactured.

Typically, as illustrated in FIGS. 1 and 2, in the curved display panel 10, a distance d1 from a plane or imaginary plane P that is perpendicular to a straight line that is perpendicular to the center of the display surface 10a of the curved display panel 10 to the center of the display surface 10a of the curved display panel 10 is longer than a distance d2 from the plane P to other positions on the display surface 10a of the curved display panel 10. Accordingly, the light L1 and L2 starting from the display surface 10a of the curved display panel 10 travels, as illustrated in FIGS. 1 and 2, in a roughly convergent manner. Accordingly, since the lens unit 30 includes a concave lens, the light L1' and L2' that are roughly parallel to each other can be incident on the inspection camera 20.

If the radius of curvature of the display surface 10a of the curved display panel 10 is identical at all positions on the display surface 10a, the inspection camera 20 can be located at the center of curvature without interposing the lens unit 30 between the curved display panel 10 and the inspection camera 20. However, in an actual curved display panel, the radius of curvature of the display surface 10a is not constant. Accordingly, only when the lens unit 30 is formed with consideration of radius of curvature at each position on the display surface 10a of the curved display panel 10 can sufficiently accurate optical information be obtained through the inspection camera 20.

Alternatively, the brightness of light emitted from each pixel of the curved display panel 10 can be distorted by the lens unit 30. For example, when the lens unit 30 having a shape of a concave lens as illustrated in FIG. 2 is used, the length of an optical path through the lens unit 30 of the light L1 emitted from a pixel located at the center portion of the display surface 10a of the curved display panel 10 is shorter than the length of an optical path through the lens unit 30 of the light L2 emitted from a pixel located at an edge portion of the display surface 10a of the curved display panel 10. The above difference may generate distortion of brightness due to the lens unit 30.

Thus, in consideration of the above, the optical information obtained by using the inspection camera 20 can be corrected in order to compensate for the influence of the lens unit 30. The degree of the brightness decrease is calculated prior to measurement when the brightness decreases as the length of optical path in the lens unit 30 increases and thus the degree of the brightness decrease can be corrected for the optical information about the light L2 emitted from the pixel located at the edge portion of the display surface 10a of the curved display panel 10. When the control unit is to be set, the control unit is set based on the corrected optical information such that the distortion due to the lens unit 30 can be prevented.

As described above, according to the one or more of the above exemplary embodiments, a curved display apparatus that can reproduce a high quality image can be manufactured. Of course, the described technology is not limited to the above effect.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more embodiments of the inventive technology have been described with reference to the figures, it will be understood by those of ordinary skill in the art that various changes in form and details may be made therein without departing from the spirit and scope of the invention as defined by the following claims.

What is claimed is:

1. A method of manufacturing a curved display apparatus, the method comprising:
    forming a curved display panel including a plurality of pixels and a controller configured to respectively apply a plurality of electrical signals to the pixels;
    arranging the curved display panel, a lens, and a camera such that the lens is interposed between the curved display panel and the camera;
    via the controller, respectively applying the electrical signals to the pixels;
    obtaining optical information with the camera while the electrical signals are applied to the pixels; and
    setting parameters of the controller which control correction of the electrical signals based at least in part on the obtained optical information.

2. The method of claim 1, further comprising the lens converting light emitted from the pixels of the curved display panel so as to be substantially parallel when incident on the camera.

3. The method of claim 2, wherein the distance between the center of a display surface of the curved display panel and an imaginary plane is greater than the distance between the imaginary plane and other positions on the display surface except the center on the display surface, wherein the imaginary plane is substantially perpendicular to a straight line extending from and perpendicular to the center of the display surface, and wherein the lens comprises a concave lens.

4. The method of claim 1, wherein the radius of curvature of a display surface of the curved display panel is not constant.

5. The method of claim 1, further comprising correcting the optical information obtained with the camera so as to correct for influence introduced due to the lens, wherein the setting of the controller is based at least in part on the corrected optical information.

* * * * *